United States Patent
Lin et al.

(10) Patent No.: US 12,142,426 B2
(45) Date of Patent: Nov. 12, 2024

(54) METHOD AND APPARATUS FOR MAKING ELECTRODES FOR AN IONIC LIQUID-BASED SUPERCAPACITOR, AND METHOD FOR MAKING SUCH A SUPERCAPACITOR

(71) Applicant: SOLVIONIC SA, Toulouse (FR)

(72) Inventors: Rongying Lin, Colomiers (FR); Anaïs Falgayrat, Castelmaurou (FR); Carolina Aravena, Machault (FR); Sébastien Fantini, Toulouse (FR); François Malbosc, Nailloux (FR)

(73) Assignee: SOLVIONIC, Toulouse (FR)

( * ) Notice: Subject to any disclaimer, the term of this patent is extended or adjusted under 35 U.S.C. 154(b) by 79 days.

(21) Appl. No.: 17/597,050

(22) PCT Filed: Jun. 25, 2020

(86) PCT No.: PCT/EP2020/067793
§ 371 (c)(1),
(2) Date: Dec. 23, 2021

(87) PCT Pub. No.: WO2020/260444
PCT Pub. Date: Dec. 30, 2020

(65) Prior Publication Data
US 2022/0270831 A1    Aug. 25, 2022

(30) Foreign Application Priority Data
Jun. 26, 2019   (FR) .......................... 1906979

(51) Int. Cl.
*H01G 11/38* (2013.01)
*H01G 11/52* (2013.01)
(Continued)

(52) U.S. Cl.
CPC ............. *H01G 11/38* (2013.01); *H01G 11/52* (2013.01); *H01G 11/62* (2013.01); *H01G 11/86* (2013.01)

(58) Field of Classification Search
None
See application file for complete search history.

(56) References Cited

U.S. PATENT DOCUMENTS 10,157,714 B1 * 12/2018 Zhamu ................. H01G 11/36
2008/0233273 A1   9/2008 Aubert et al.
(Continued)

FOREIGN PATENT DOCUMENTS

CN    106531475 A    3/2017
CN    106548875 A    3/2017
(Continued)

OTHER PUBLICATIONS

International Search Report for International Application No. PCT/EP2020/067793 dated Sep. 17, 2020, 4 pages.
(Continued)

*Primary Examiner* — Dion R. Ferguson
(74) *Attorney, Agent, or Firm* — TraskBritt (57) ABSTRACT

A method for making an electrode for an ionic liquid-based supercapacitor comprising two electrodes (anode, cathode) separated by an ionic polymer electrolyte separator, comprising:
a step for making a carbon paste resulting from mixing carbon materials, ionic liquids and a binder, so as to obtain an active material for the electrode at room temperature, and
a step for forming the electrode from mechanically processing the active material.
A supercapacitor comprising a stack of a cathode electrode, an electrolyte separator and an anode electrode, the cathode
(Continued)

and anode electrodes being electrically connected to current collectors, wherein the electrolyte separator comprises a polymer with an ionic liquid and the electrodes comprise a carbon-based active material mixed with an ionic liquid electrolyte and a binder.

18 Claims, 5 Drawing Sheets

(51) Int. Cl.
*H01G 11/62* (2013.01)
*H01G 11/86* (2013.01)

(56) References Cited

U.S. PATENT DOCUMENTS

| | | | |
|---|---|---|---|
| 2009/0272946 A1* | 11/2009 | Lu | H01G 11/38 252/502 |
| 2011/0194231 A1 | 8/2011 | Aitchison et al. | |
| 2012/0120552 A1* | 5/2012 | Ito | H01G 11/28 361/503 |
| 2014/0035098 A1 | 2/2014 | Dunn et al. | |
| 2015/0349313 A1* | 12/2015 | Budd | H01G 11/26 429/246 |
| 2016/0118198 A1* | 4/2016 | Okuno | H01G 11/36 29/25.03 |
| 2017/0125175 A1 | 5/2017 | Kim et al. | |
| 2017/0148573 A1 | 5/2017 | Zhamu et al. | |
| 2017/0263939 A1* | 9/2017 | Lin | H01M 4/137 |
| 2017/0324086 A1* | 11/2017 | Nitta | H01M 4/134 |
| 2018/0062219 A1 | 3/2018 | Miles et al. | |
| 2018/0212253 A1* | 7/2018 | Lockett | H01G 11/46 |
| 2018/0337550 A1* | 11/2018 | Agrelo | H01G 11/22 |
| 2019/0189364 A1* | 6/2019 | Hatton | H01G 11/64 |
| 2020/0254726 A1* | 8/2020 | Taher | B32B 9/007 |
| 2022/0270831 A1* | 8/2022 | Lin | H01G 11/38 |

FOREIGN PATENT DOCUMENTS

| | | | | |
|---|---|---|---|---|
| CN | 108091497 A | * | 5/2018 | H01G 11/40 |
| CN | 106449180 B | | 10/2018 | |
| CN | 109928383 A | * | 6/2019 | |
| JP | 2000-253938 A | | 9/2000 | |
| JP | 2001-267187 A | | 9/2001 | |
| JP | 2011-035205 A | | 2/2011 | |
| JP | 2013-229308 A | | 11/2013 | |
| JP | 2016162993 A | * | 9/2016 | |
| JP | 2018-517285 A | | 6/2018 | |
| JP | 2019-528574 A | | 10/2019 | |
| KR | 10-2013-0136149 A | | 12/2013 | |
| KR | 2019-0008966 A | | 1/2019 | |
| WO | 2005/088657 A3 | | 9/2005 | |
| WO | 2007/091517 A1 | | 8/2007 | |
| WO | 2011/014970 | | 2/2011 | |
| WO | 2013/073526 A1 | | 5/2013 | |
| WO | 2017/065963 A1 | | 4/2017 | |
| WO | 2017/091474 A1 | | 6/2017 | |
| WO | WO-2019054931 A1 | * | 3/2019 | B32B 15/08 |
| WO | 2006/125901 A2 | | 1/2022 | |

OTHER PUBLICATIONS

International Written Opinion for International Application No. PCT/EP2020/067793 dated Sep. 17, 2020, 8 pages.
Mecerreyes, David, Polymeric Ionic Liquids Broadening the Properties and Applications of Polyelectrolytes, Progress in Polymer Science, vol. 36, (21011), pp. 1629-1648.
Von Zamory et al., Polymeric Ionic Liquid Nanoparticles as Binder for Composite Li-ion Electrodes, Journal of Power Sources, vol. 240, (2013), pp. 745-752.
Japanese Office Action for Application No. 2021-576583 dated Jan. 26, 2024, 6 pages.
Japanese Search Report for Application No. 2021-576583 dated Jan. 26, 2024, 20 pages.
Japanese Office Action for Application No. 2021-576583 dated Jul. 23, 2024, 4 pages.
Korean Written Opinion for Korean Application No. 10-2022-7002859 dated Jun. 26, 2024, 14 pages with English translation.

* cited by examiner

METHOD AND APPARATUS FOR MAKING ELECTRODES FOR AN IONIC LIQUID-BASED SUPERCAPACITOR, AND METHOD FOR MAKING SUCH A SUPERCAPACITOR

CROSS-REFERENCE TO RELATED APPLICATIONS

This application is a national phase entry under 35 U.S.C. § 371 of International Patent Application PCT/EP2020/067793, filed Jun. 25, 2020, designating the United States of America and published as International Patent Publication WO 2020/260444 A1 on Dec. 30, 2020, which claims the benefit under Article 8 of the Patent Cooperation Treaty to French Patent Application Serial No. 1906979, filed Jun. 26, 2019.

TECHNICAL FIELD

The present disclosure relates to a method and apparatus for making electrodes for an ionic liquid-based supercapacitor. It also relates to a method for making such a supercapacitor, to electrodes, combinations of electrodes and electrolytes and to supercapacitors.

The field of the present disclosure includes ultrafast electrochemical batteries, supercapacitors, or electrochemical capacitors.

BACKGROUND

Charge storage in electrochemical capacitors is based on electrostatic attractions between the surface charge of the electrode material and of the electrolyte ions. Porous carbons are usually used as the active material for the electrode as they possess high specific surface areas of up to 4000 $m^2/g$. There is a large pore size distribution in these pores. The accessibility of the electrolyte ions to the active surface of carbon can be reduced by some bottlenecks of the porous network due to the tortuosity of the porous network. Also, the filling of electrolyte in the tightly wounded supercapacitor device is difficult when ionic liquids (slightly more viscous than organic based electrolytes) are used. This electrolyte filling step usually takes place after the electrochemical cell has been assembled and can be time-consuming.

Current technology of electrolyte employs solvents that are flammable and have high vapor pressure. This leads to high pressure build up within the device under temperature variations or high temperatures.

The energy density of the device is affected by the choice of materials used for components, such as current collectors and separators, etc. These materials add to the total weight and hence can directly affect the overall energy density, which is typically on the order of 10 kWh/kg.

WO2017091474A1A discloses a process for producing an electrode for a supercapacitor cell, the process comprising: (A) preparing a plurality of electrically conductive porous layers and a plurality of wet electrode layers comprising an electrode active material and an optional conductive additive mixed with a liquid or gel electrolyte, wherein the conductive porous layers contain interconnected conductive pathways and at least 80% by volume of pores; and (B) stacking and consolidating a desired number of the porous layers and a desired number of the wet electrode layers in an alternating sequence to form an electrode having a thickness no less than 100 µm (preferably, greater than 200 µm; more preferably, greater than 400 µm; further more preferably, greater than 600 µm; and most preferably, greater than 1,000 µm).

US2017125175A1 discloses a process of treating activated carbon using carbon dioxide activation, and a supercapacitor that is manufactured using activated carbon, which is treated with carbon dioxide, as an electrode material to thus be stably operable at a high voltage. The supercapacitor according to the present disclosure includes improved materials of an electrode and an electrolyte constituting the supercapacitor and has optimized electrode properties so as to be stably operable even at a high voltage.

WO2017065963A1 discloses a process for producing a supercapacitor cell, comprising: (a) Continuously feeding a conductive porous layer to a cathode material impregnation zone, wherein the conductive porous layer contains interconnected electron-conducting pathways and at least 70% by volume of pores; (b) Impregnating a wet cathode active material mixture (containing a cathode active material and an optional conductive additive mixed with a liquid electrolyte) into pores of this porous layer to form a cathode electrode; (c) Preparing an anode electrode in a similar manner; and (d) Stacking an anode electrode, a porous separator, and a cathode electrode to form the supercapacitor, wherein the anode electrode and/or the cathode electrode has a thickness no less than 100 µm; and/or wherein the anode or cathode active material constitutes an electrode active material loading no less than 7 $mg/cm^2$ in the anode or the cathode.

CN106548875A discloses an all-solid-state flexible transparent supercapacitor and a preparation and an application thereof. The supercapacitor takes a flexible transparent thin film as an electrode; and an electrolyte is the solid-state gel electrolyte. By taking the flexible transparent thin film as the single electrode of the supercapacitor and a high-molecular polymer as the solid-state gel electrolyte, combining with layer-by-layer self-assembly, and designing, preparing and assembling with technologies such as laser etching or template method and the like, the flexible transparent supercapacitor is obtained.

CN106531475A discloses a production technology of a supercapacitor electrode. The production technology is characterized by comprising the following steps of weighing the following raw materials in percentage by mass: 10% of a conductive agent, 5% of a binder and 85% of activated carbon, mixing the raw materials evenly and adding deionized water to adjust into paste; forming a film on a double-roller machine in a rolling manner and carrying out vacuum drying at 50-60 DEG C. for 1-2 hours for removing one part of moisture to obtain a semi-dry film; firstly, rolling the semi-dry film on the front surface of a current collector to obtain a single-sided coated electrode; secondly, rolling the semi-dry film on the reverse surface of the single-sided coated electrode to prepare a double-sided coated electrode; and finally stripping the thoroughly dried double-sided coated electrode to prepare the electrode.

CN106449180A discloses a method for increasing the specific capacitance of a graphene-based supercapacitor. An electrode of a supercapacitor is prepared from graphene, and the theoretical capacitance can be up to 550 F/g. However, because of factors such as material properties and preparation techniques, generally the contained specific capacitance is within 150-300 F/g. According to the method, sodium chloride and urea are doped into a graphene oxide solution of a liquid crystal state for the first time, a film is prepared from the solution by using a scraper in a coating manner, and thus a film obtained after hydrothermal reduction is adopted as the electrode of the supercapacitor. Due to added substances, graphitization stacking of graphene layers can be prevented and nitrogen doping can be achieved in the hydrothermal reduction process of the graphene film, so that the specific capacitance can be greater than 400 F/g when aqueous electrolyte is used, and is at a relatively high level.

WO2011014970A2 discloses a method for fabricating a supercapacitor-like electronic battery. The steps for fabricating a supercapacitor-like electronic battery are as follows. A first current collector is formed on a substrate. A first electrode is formed on the first current collector. A first electrode is formed from a first solid state electrolyte and a first conductive material where the first conductive material is irreversible to the mobile ions contained in the first solid state electrolyte and the first conductive material exceeds the percolation limit. An electrolyte is formed on the first electrode. A second electrode is formed on the electrolyte. The second electrode is formed from a second solid state electrolyte and a second conductive material where the second conductive material is irreversible to the mobile ions contained in the second solid state electrolyte and the second conductive material exceeds the percolation limit. A second current collector is formed on the second electrode.

US20140035098A1 discloses a solid-state supercapacitor including a first electrode, a second electrode, and a solid-state ionogel structure between the first electrode and the second electrode. The solid-state ionogel structure prevents direct electrical contact between the first electrode and the second electrode. Further, the solid-state ionogel structure substantially fills voids inside the first electrode and the second electrode.

WO2006125901A2 discloses an electrode for energy storage systems, the production method thereof and an energy storage system comprising the electrode. More specifically, the present disclosure relates to films of carbonaceous active material based on activated carbon with a determined porosity, purity and particle-size distribution and a polymer binder, whereby the electrodes comprise one such coating film on a current collector and the supercapacitors comprise at least one of the electrodes. This document also discloses a method of preparing the aforementioned films, electrodes and supercapacitors.

WO2005088657A2 discloses a preparation process of electrode based on activated carbon and carbon nanotubes on a collector, and a supercapacitor provided with such electrodes.

The object of the present disclosure is to get supercapacitors with higher energy densities compared to energy densities provided by prior art supercapacitors. Another object of the present disclosure is to propose a new method for processing electrodes for such supercapacitors that omits the electrolyte filling step in the cell production process, and would be easier to implement, without any use of volatile solvent.

BRIEF SUMMARY

This object is achieved with a method for making an electrode for an ionic liquid-based supercapacitor comprising two electrodes (anode, cathode) separated by an ionic polymer electrolyte separator, comprising:
  a step for making a carbon paste resulting from mixing carbon materials, ionic liquids and a binder, so as to obtain an active material for the electrode at room temperature,
  a step for forming the electrode from mechanically processing the active material.

The carbon paste can advantageously comprise of at least 10 to 40 in weight percentage of carbon active material and 0 to 10 in weight percentage of binder mixed in 60 to 90 in weight percentage of electrolyte for 100% weight of the carbon paste.

The electrode forming step can implement a paste 3D printing technique or a paste stamping technique.

Ionic liquids are also used to mix the carbon materials with the binder. Only ionic liquids with a high quality [Purity 99.9%; $H_2O \leq 5$ ppm; halides$\leq 1$ ppm; Lithium, Sodium and Potassium$\leq 10$ ppm; Organic nitrogen compounds$\leq 10$ ppm; Color test 20-10 Hazen] achieved increased device energy densities of 20 to 30 Wh/kg. Ionic liquids can include cations that consist of the alkyl imidazolium, alkyl pyrrolidinium-based, morpholinium-based, pyridinium-based, ammonium-based and anions that consist of bis(trifluoromethanesulfonyl)imide (TFSI), bis(fluorosulfonyl)imide (FSI), dicyanamide (DCA), 4,5-dicyano-2-(trifluoromethyl)imidazolide (TDI), fluorosulfonyl-(trifluoromethanesulfonyl)imide (FTFSI).

A supercapacitor according to the present disclosure can comprise a stack of a cathode electrode, an electrolyte separator and an anode electrode, the cathode and anode electrodes being electrically connected to current collectors, wherein the electrolyte separator comprises an ionic polymer with an ionic liquid and the electrodes comprise a carbon-based active material mixed with an ionic liquid electrolyte and a binder.

The electrolyte separator has a dual function as an electrolyte and as a separator and is hereinafter referred to as an ionic polymer electrolyte.

The ionic polymer electrolyte can be made up of an ionic polymer and of ionic liquids, the ratio of ionic liquid to ionic polymer being selected so as to obtain a self-standing electrolyte separator.

The ionic liquid of the electrolyte separator and the ionic liquid of the electrodes can be distinct.

According to another aspect of the present disclosure, there is proposed an apparatus for making an electrode for an ionic liquid-based supercapacitor comprising two electrodes (anode, cathode) separated by a separator made of an ionic polymer electrolyte, comprising:
  means for making a carbon paste resulting from mixing carbon materials, ionic liquids and a binder, so as to obtain an active material for the electrode at room temperature, and
  means for forming the electrode from mechanically processing the active material.

The present disclosure also relates to a combination of an electrode and of an electrolyte for an ionic liquid-based supercapacitor, made by implementing the method according to the present disclosure.

The supercapacitor of the present disclosure can be adapted to match a specific support shape, and this support can be flexible.

The current collectors can be printed or deposited on collecting devices.

According to still another aspect of the present disclosure, there is proposed a method for making a supercapacitor, from electrodes formed from carbon paste resulting from mixing carbon materials, ionic liquids and a binder, so as to obtain an active material for the electrode at room temperature, and from an electrolyte separator comprising an ionic polymer with an ionic liquid.

The method for making a supercapacitor according to the present disclosure, can comprise:
  a step for providing a first current collector, a step for forming on the first collector a first electrode from a first carbon paste resulting from mixing carbon materials, ionic liquids and a binder, so as to obtain an active material for the electrode at room temperature, a step for providing on the first electrode an electrolyte separator comprising an ionic polymer with an ionic liquid, a step for providing a second current collector, a step for forming on the second collector a second electrode from a second carbon paste resulting from mixing carbon materials, ionic liquids and a binder, and a step for assembling the second collector and electrode, the electrolyte separator, the first collector and electrode.

The electrolyte to electrode weight ratio can be advantageously comprised in the range [60%-90%].

The ionic liquid polymer electrolyte can be made up of an ionic polymer and of free, non-polymer ionic liquids.

The ionic liquid polymer electrolyte can alternatively be made up of an ionic liquid polymer having an ionic polymer and a free ionic liquid providing free conducting electrolyte ions throughout the whole stack.

This free ionic liquid can be the ionic liquid that has been used to wet the cathode (anode) materials during electrode processing.

The ionic liquid polymer electrolyte preferably has a thickness between 10 and 50 µm.

According to another aspect of the present disclosure, there is proposed a method for processing an electrode for an ionic liquid-based supercapacitor comprising two electrodes (anode, cathode) separated by a separator made of an ionic polymer electrolyte, comprising:

a step for adding the electrolyte (IL) to the dry active material in powder form in a predetermined and optimized ratio, so as to get the active material impregnated by the ionic liquid electrolyte (IL), and a step for processing a carbon paste, so as to obtain an ionic liquid-containing active material for the electrode.

The method according to the present disclosure may further comprise a step for folding and/or kneading the electrolyte (IL) several times into the paste, and this folding and/or kneading step can be implemented by a mixer followed by a calendaring machine or a three-rolls mill, a jet mill or an extrusion machine.

It may also comprise a step for optimizing an amount of ionic liquid electrolyte required for processing an electrode, the optimization step including an estimation of an amount of electrolyte trapped in the porous and or layered network of the active material.

The estimation of an amount of electrolyte trapped in the porous network of the active material may implement an optimization test including assembling a cell with the electrolyte (IL), cycling the cell, isolating an electrode and weighing the electrode.

The optimization test may further include washing the electrode and then drying the electrode before weighing.

The step for processing the carbon paste may be achieved to obtain a dough ready to be used as an active material for electrodes.

The method according to the present disclosure may further comprise a step for producing the ionic polymer electrolyte later assembling the ionic polymer electrolyte with the electrodes to form the devices, a step processing the ionic liquid polymer electrolyte directly onto one of the two electrodes and later assembling with the second electrode to form the device.

According to yet another aspect of the present disclosure, there is proposed an apparatus for processing an electrode for an ionic liquid-based supercapacitor comprising two electrodes (anode, cathode) separated by a separator made of an ionic liquid polymer electrolyte (IL), comprising:

means for adding the electrolyte (IL) to the dry active material in powder form in a predetermined and optimized ratio, so as to get the active material impregnated by the ionic liquid electrolyte (IL), may also comprise means for adding the binder as a dispersion in the electrolyte (IL) to be completely solvent free, and means for processing a carbon paste, so as to obtain an ionic liquid containing active material for the electrode.

The means for processing the carbon paste can be advantageously implemented by mixing the raw materials together at room temperature.

With the present disclosure, the process starts with a cathode (anode) active material mixture comprising the binder, active material and electrolyte (IL). Only after a certain stage of working on the mixture into a dough by kneading and mixing, with elastic binding network established that the cathode (anode) is formed via a folding and/or kneading manner that can be replaced by a three-roller mill, an extrusion machine, or a jet mill, on an industrial scale.

The mass percentage for different electrolytes and active materials is specific to each electrode/electrolyte pair.

The electrolyte can be at least an ionic liquid or a mixture of ionic liquids that are eutectic and/or having improved physicochemical characteristics compared to a neat ionic liquid, as a result of the formulations especially for wide temperature applications (−50° C. to 150° C.).

Definitions

Ionic liquid: a molten salt at a temperature lower than 100° C.

Ionic polymer: a polymer having repeating units of cationic or anionic sites in a polymer chain.

Gel electrolyte: an electrolyte of semi-solid or semi-liquid state, not hard.

BRIEF DESCRIPTION OF THE DRAWINGS

The figures will detail some examples of embodiment of the present disclosure, in particular.

DETAILED DESCRIPTION

Figure 1:
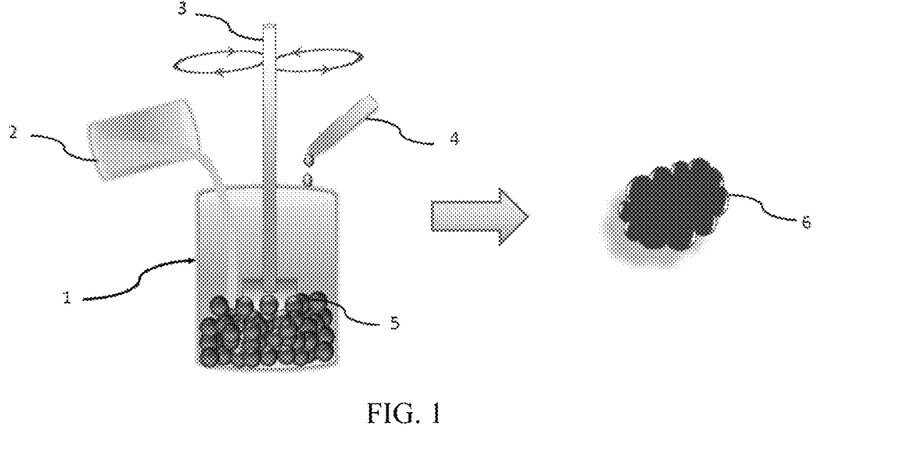
FIG. 1 represents an apparatus for making a carbon paste implemented in the present disclosure.
Figure 3:
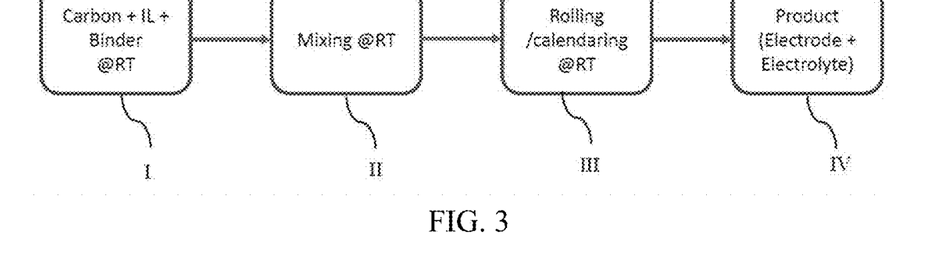
FIG. 3 illustrates the steps of the method for making an electrode according to the present disclosure.

With reference to FIGS. 1 and 3, an initial step I involves pouring at room temperature an electrolyte 2 with a liquid/gel formulation, a binder 4 and an active carbon material 5 in a pot 1 that is equipped with a mechanical kneading blade 3. This blade 3 ensures (step II) mixing and kneading of the components poured in the pot 1, without any Volatile Organic Component (VOC) solvent. The deliverable of this step II implemented at room temperature is a carbon dough 6.

Figure 2:
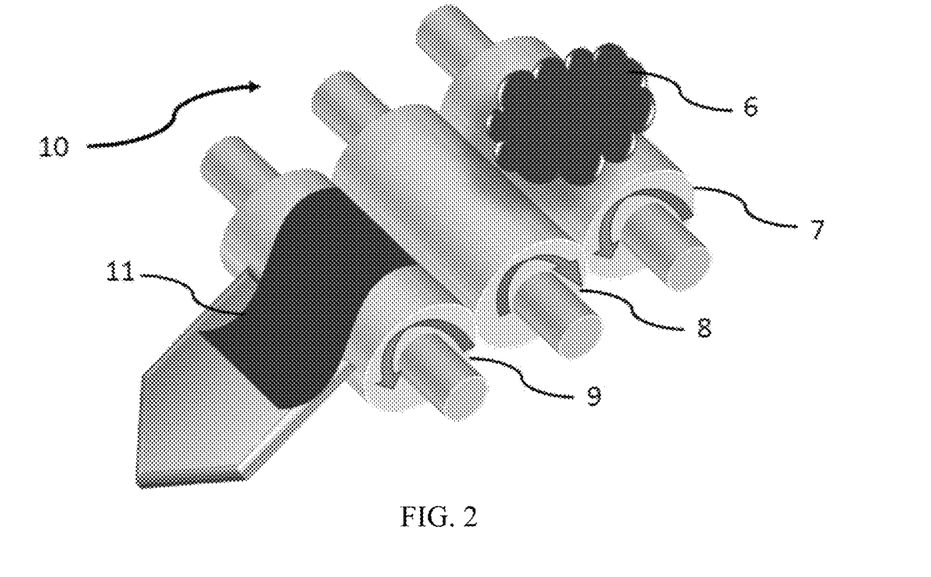
FIG. 2 represents an apparatus for forming an electrode from carbon paste of FIG. 1.

With reference to FIGS. 2 and 3, the carbon dough 6 is processed (step III) at room temperature into a calendaring machine 10 comprising three rolls 7, 8, 9, so as to make a paste ribbon 11 constituting (step IV) a combination of an electrode and an electrolyte.

A practical electrode processing method that takes into account the optimization of the electrolyte/electrode ratio to ensure the device is filled with materials that are fully exploited in terms of surface area and volume, to efficiently increase the energy density of the device, with no extra volume/excess of materials that do not contribute to the charge storage.

The process of optimization starts with the determination of mass of IL required for a known mass of electrode. This is by assembling a cell with the specific IL, cycling the cell at elevated temperature to elevated voltage. The electrode is then isolated and weighed. Washing the electrode under ultrasound with acetonitrile, drying of electrode by vacuum, weighing of the electrode will reveal the amount of electrolyte trapped in the porous network of the active material, which is termed here as the optimized weight of the electrolyte.

The electrode processing steps include:
introducing an optimized mass percentage of electrolyte to carbon,
introducing a defined amount of binder dispersed in electrolyte (IL),
folding and/or kneading the electrode material with electrolyte (for example, a mixer machine),
carbon paste slurry worked to a dough that is ready to be used as electrolyte (IL) containing electrode material, and
drying the electrolyte-impregnated electrode material at elevated temperature under vacuum.

The electrode is then ready to be used within a supercapacitor.

The conditions of production require a dry room and for application use, an argon environment.

The electrode processing according to the present disclosure could be used to improve energy densities and safety of batteries, supercapacitors for automotive, aeronautic, space, portable tools, robots.

It could also find applications for ionic-gel-based electronic skin (pressure/strain sensors, electric double-layer transistors, etc.), flexible displays, and soft actuators, wearables, by applying the process according to the present disclosure to other ionic liquids (but not limiting to only ionic liquids) and using other electrode materials such as graphene.

The electrode process is not limited to only ionic liquids but can be applied to other non-volatile liquid/gel electrolytes such as certain glymes, gel polymers, UV-curable monomers.

The electrode process can also be used in combination with ionic liquids using other non-volatile electrolyte components such as certain glymes, carbonates, nitriles, gel polymers, UV-curable monomers.

This process can also be applied to the electrochemistry of supercapacitors to improve power and energy densities, with the objective to reach Gen 1-30 kWh/kg, and Gen 2-50 kW/kg and electrochemistry of batteries.

Active materials include materials (existing in powder form) of 0-dimensional, 1-dimensional, 2-dimensional and 3-dimensional ion transport and conductivity, such as onion-like carbons (OLCs), carbon nanotubes (CNTs), MXenes, boron nitrides (BNs), Metal organic frameworks (MOFs), graphene, reduced graphene oxide, graphite and activated carbon.

Materials also include their hybrids or 2D heterostructures as a result of combinations of materials from different categories.

Experimental Results

Supercapacitor coin cells (CR2032) are assembled in a glove box under argon atmosphere of less than 0.5 ppm of $O_2$ and $H_2O$. Electrodes were made by mixing and kneading of active materials powder (YP80F from Kuraray, CNP00001 and GN1P0005 from ACS Material), ionic liquids as electrolyte (less than 5 ppm water from SOLVIONIC SA) and Polytetrafluoroethylene (Fuel Cell Earth, Massachusetts) as binder at room temperature. Ionic liquid filled electrodes are cut into 11 mm disk of about 200 up thick and laminated on aluminum current collectors. The electrodes were separated by about 30-40 um of ionic liquid polymer electrolyte separator (SOLVIONIC SA, Toulouse). The coin cells were then sealed by a coin cell crimper before electrochemical characterizations.

Electrochemical Impedance Spectroscopy (EIS), Cyclic Voltammetry and galvanostatic cycling measurements were performed using a VMP3 potentiostat (BioLogic). EIS was performed on 2-electrode cells at a DC bias of 0 V by applying an approximately 5 mV RMS sine wave at frequencies from about 80 kHz to about 10 mHz. Cyclic Voltammetry obtained by measuring the current feedback on 2-electrode cells by applying and controlling the cell voltage from 0 V to an upper voltage of $3V \leq Ecell \leq 4V$ at 20 mV/s.

Figure 5:
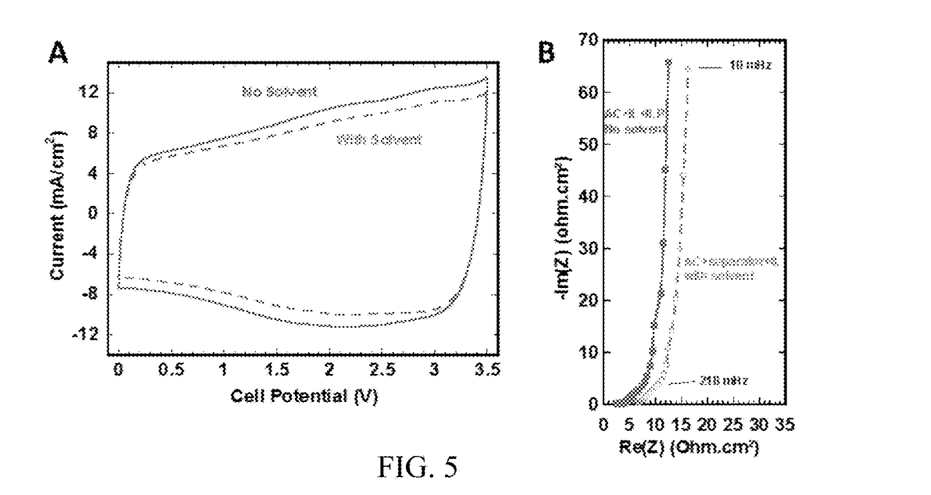
FIG. 5 shows (A) Cyclic voltammetry profiles of supercapacitor cells assembled with YP80 and EMITFSI comparing new and conventional processing method and (B) Electrochemical Impedance Spectroscopy (EIS) plots.

With reference to FIG. 5, using 1) new processing method with EMITFSI ionic liquids without solvent, and 2) conventional processing method in the presence of solvent, later filled with EMITFSI ionic liquids, both using an ionic liquid polymer electrolyte separator at 20 mV/s at room temperature from 0 to 3.5V. Both cyclic voltammetry profiles of current density against cell potential show capacitive behavior in similar testing conditions and the same cell characteristics in FIG. 5A. The cyclic voltammetry profiles of the cells prepared using the new processing with ionic liquid polymer electrolyte separator displayed electrochemical profiles that are better than the traditional/conventional process, which uses a solvent in excess. FIG. 5B shows the electrochemical impedance spectroscopy profiles of coin cells assembled with ionic liquid, EMITFSI in YP80 activated carbon using 1) new electrode processing method+ionic liquid polymer electrolyte separator and 2) conventional processing method and commercial separator. The new method produced cells with lower impedance values than conventional methods, which translate to lower equivalent series resistance, ESR and better power deliverance.

Figure 6:
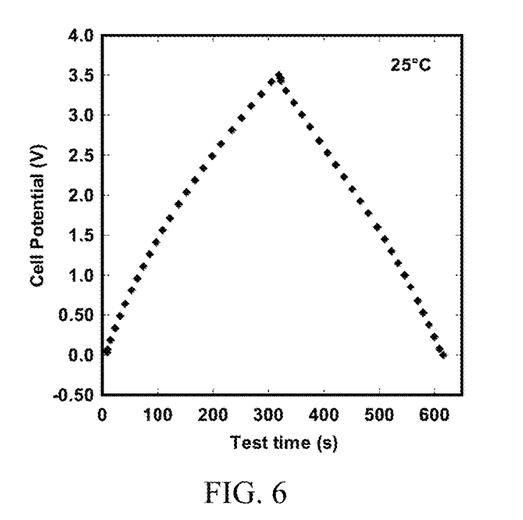
FIG. 6 depicts the galvanostatic charge/discharge profile of supercapacitor cell assembled with YP80 and EMITFSI using new processing method.

With reference to FIG. 6, the characteristic capacitive linear galvanostatic charge and discharge profile at a constant current density of about 5 mA/cm$^2$ at 25° C. from 0 to 3.5V of the same supercapacitor cell tested for FIG. 5 is shown, where the slope of the discharge curve is used to calculate the capacity. The no-solvent new processing method improves the amount of charge stored in the supercapacitor cell due to better wettability of the electrode materials and the ionic liquids. With this new method, the time for electrolyte ions to diffuse to the surface of the active materials is reduced, contributing to better performance. In combination with the ionic liquid polymer electrolyte separator, the use of ionic liquids has largely increased the capacitance from 117 F/g to 150 F/g in the same carbon material. This corresponds to a 28% increase in capacitance and five times increase in device specific energy density.

Figure 7:
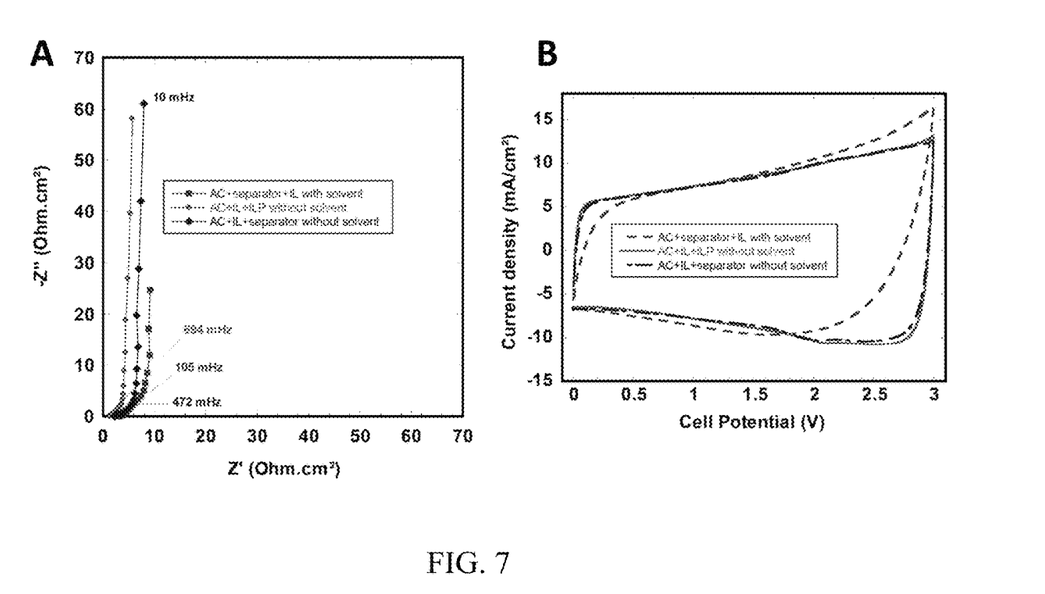
FIG. 7 shows (A) Electrochemical Impedance Spectroscopy profiles of supercapacitor cells assembled with YP80 activated carbon and EMIFSI using new processing method and (B) the corresponding cyclic voltammetry profiles.

FIG. 7 displays the results of another example using a different anion, bis(Fluorosulfonyl)imide [FSI] from the previous example, bis(TriFluoromethanesulfonyl)imide [TFSI]. It shows the enhancement of low electrochemical impedance attributed to the use of new electrode processing method with EMIFSI without solvent and an ionic liquid polymer electrolyte separator. FIG. 7A shows the electrochemical impedance spectroscopy profiles of coin cells assembled with ionic liquid, EMIFSI in YP80 activated carbon using 1) new electrode method, 2) new electrode processing method+ionic liquid polymer separator and 3) conventional processing method and commercial separator. The new method produced cells with lower impedance values than conventional methods, which translate to lower equivalent series resistance and better power deliverance. The use of new processing method with EMIFSI also decreases the ESR of the cell, and the replacement of the commercial separator with an ionic liquid electrolyte separator contributed to two significant improvements: 1) further reduction in ESR, and 2) huge decrease in the charge transfer resistance between interfaces (smaller diameter of semicircle). This is evidently due to the improved interfacial contact between the electrodes and the separator, and the ionic conducting nature of the separator that serves as both an electrolyte reservoir as well as an electrical barrier. This two-step improvement in impedance thus greatly enhances the charge transfer efficiency as seen in the charge transfer occurring at higher frequency of 15 kHz compared to 6 kHz. Fast charge transfer phenomenon occurs at high frequencies while slower phenomenon such as electrolyte diffusion occurs at lower frequencies. The 45° C. profile leading to a knee frequency of 694 mHz follows a Warburg behavior, characteristic of phenomenon due to diffusion. The shorter Warburg lengths with new processing method and an ionic liquid electrolyte separator implies that the wetting times of the electrodes are faster compared to longer Warburg lengths. These findings translate to improved coulombic efficiency, lower power loss due to lower ESR, and better power deliverance. The change of anion from TFSI to FSI resulted in the achievement of wetting of the electrode at a faster rate (shorter length of Warburg diffusion and at higher frequency). FIG. 7B shows the corresponding cyclic voltammetry profiles of the same cells at a scan rate of 20 mV/s at 25° C. from 0V to 3.5V. The cyclic voltammetry profile recorded from the cell using the conventional method with solvent shows a less rectangular profile than the new method. A rectangular CV profile is a characteristic of an ideal supercapacitor.

Figure 8:
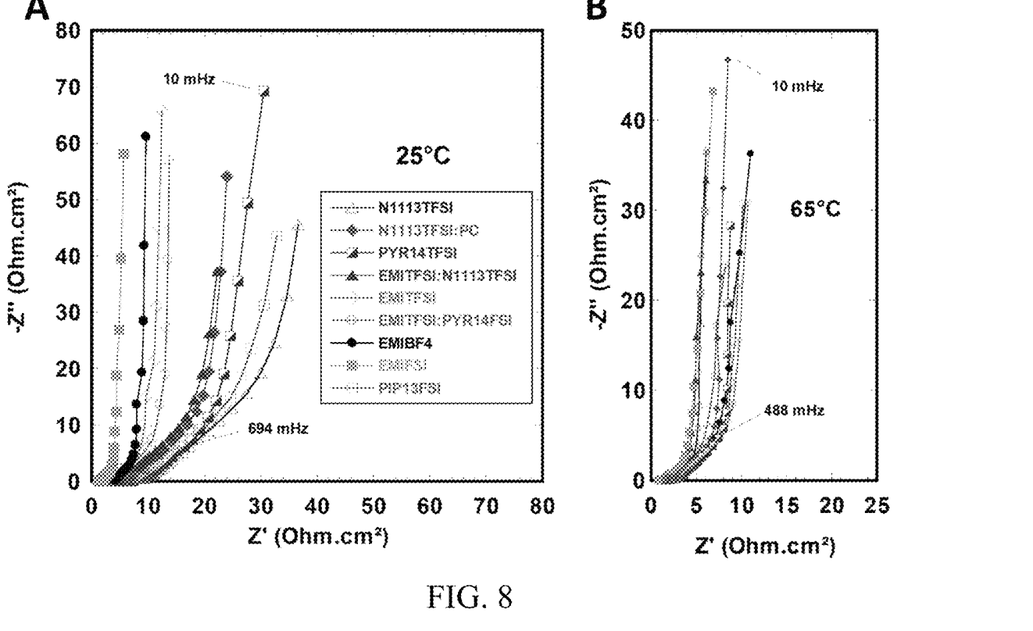
FIG. 8 shows the electrochemical Impedance Spectroscopy profiles of supercapacitor cells assembled with YP80 activated carbon using ionic liquid electrolyte separator and new processing method without solvent and various ILs without solvent at room temperature (A) and at 65° C. (B)

These EIS profiles in FIG. 8 show that the ionic liquids with the different combinations of cations, Pyrrolidinium (PYR14), Ammonium (N1113), Piperidinium (PIP13), Imidazolium (EMI) and anions, bis(Trifluoromethanesulfonyl)imide (TFSI) and bis(Fluoromethanesulfonyl)imide (FSI) all display capacitive behavior when used in the new processing method at room temperature(A) and at 65° C. (B). Pure ILs: PYR14TFSI, PIP13FSI, N1113TFSI, EMITFSI, EMIBF4, EMFSI; Eutectic mixtures: EMITFSI+N1113TFSI and EMITFSI+PYR14FSI; Mixture: N1113TFSI+PC.

Figure 9:
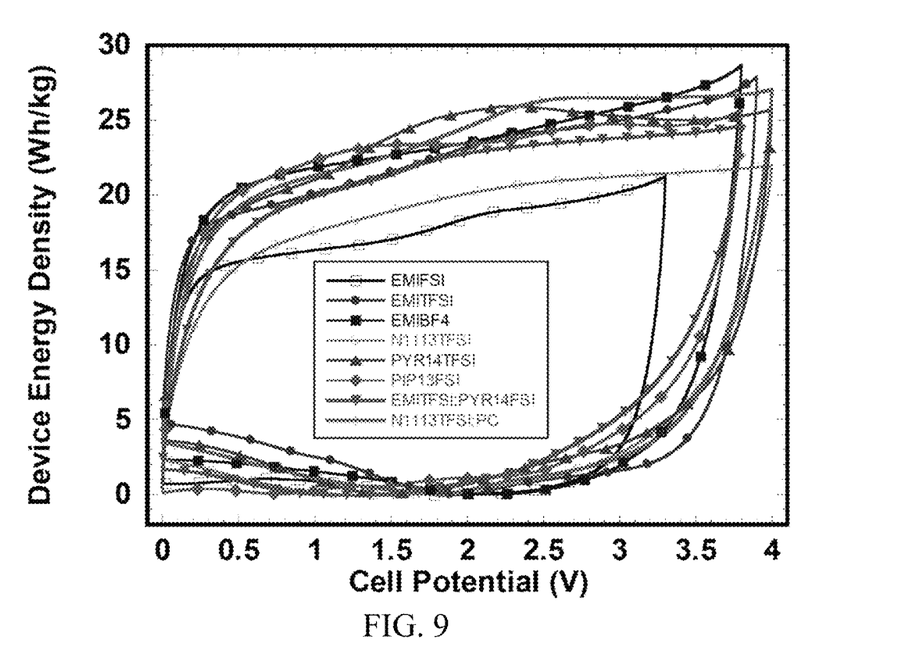
FIG. 9 shows cyclic voltammetry profiles (expressed in device energy densities) of supercapacitor cells assembled using commercial activated carbon YP80 electrodes using the solvent-free processing method with different ionic liquids at room temperature.

Different ionic liquids with the different combination of cations and anions have been demonstrated in a commercial activated carbon YP80 to show capacitive behavior at room temperature (FIG. 9). The capacitance achieved 30 Wh/kg in ionic liquids that cycled at 4 volts. This graph shows the energy densities of the same type of activated carbon YP80 and different ionic liquids EMITFSI, EMIFSI, EMIBF4, N1113TFSI, PYR14TFSI, PIP13FSI, EMITFSI:PYR14FSI, and N1113:PC, at room temperature.

Figure 10:
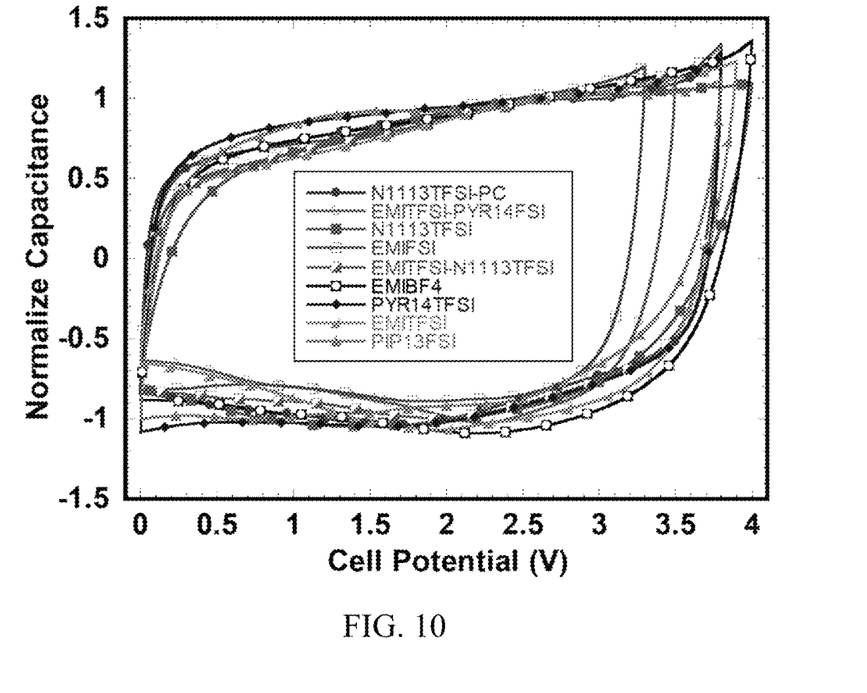
FIG. 10 shows normalized cyclic voltammetry profiles of supercapacitor cells assembled using different commercial carbon materials (activated carbon YP80 from Kuraray, CNP0001 and GN1P0005 from ACS) to make electrodes using the solvent-free processing method.

Carbon materials such as graphenes and two types of activated (sources listed in Table 1) as well as their mixtures in different proportions have been assembled in supercapacitor coin cells and tested. Different carbon materials and their mixtures have been shown to display capacitive behavior in FIG. 10. As the different carbon materials have different weight densities, the capacitances have been normalized to compile the electrochemical profiles of the different carbon/electrolyte systems at room temperature cycled from 0V to an upper voltage of 3.3 to 4V depending on the stability of each system.

| Electrolyte | Active material | % Electrolyte in activated material |
|---|---|---|
| PYR14TFSI | GN1P0005, ACS Material | 96 wt % |
| N1113TFSI/PC | YP80F, Kuraray | 77 wt % |
| PIP13FSI | CNP00001, ACS Material | 72 wt % |
| N1113TFSI | YP80F, Kuraray | 76 wt % |
| EMIFSI | CNP00001, ACS Material | 70 wt % |
| EMITFSI:PYR14FSI | CNP00001, ACS Material | 69 wt % |

Experimental Example 1

Figure 4:
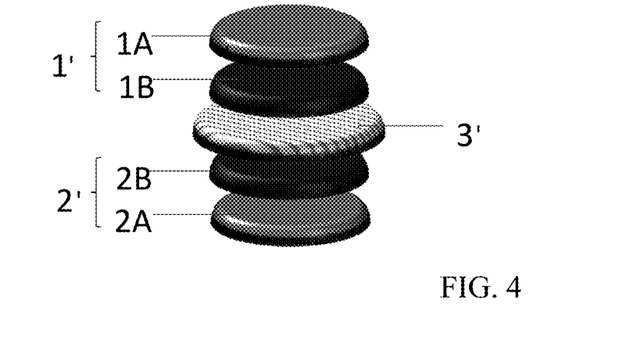
FIG. 4 is a diagram illustrating the assembly of a supercapacitor, layer by layer.

With reference to FIG. 4, first of all, cathode stack 1' was formed. First, 0.97 g of an ionic liquid (EMITFSL, SOLVIONIC SA), and 0.013 g of binder (PTFE) were added to 0.25 g of an active material activated carbon (YP80) and mixed and kneaded into a dough for 30 minutes in open air to form cathode paste 1B. Next, the cathode paste 1B is roller pressed on one surface of the cathode current collector 1A made of carbon coated aluminum foil (with a thickness of 70 um) such that the thickness of the cathode is about 200 um. Next, the laminated cathode stack 1' is dried in an oven under vacuum at 80° C. for 60 minutes. Finally, the cathode current collector 1A including the cathode active material layer 1B formed thereon was cut into a disk (with a diameter of 8 mm).

Next, by similar steps to those of forming the cathode 1', the anode active material layer 2B was formed on one surface of the anode current collector 2A to form the anode stack 2' in disk shape.

After that, the cathode 1' was laminated to anode stack 2' such that the cathode active material layer 1B and the anode active material layer 2B to face each other with the commercial separator 3' ($Al_2O_3$, Evonik) in between. Thus, the electrochemical capacitor (a sealed C2032 coin cell from MTI corporation) was completed as shown in FIG. 4.

Experimental Example 2

A similar electrochemical capacitor illustrated in FIG. 4 was formed by similar steps to those in Experimental Example 1, except that the commercial separator 3' is replaced by an ionic liquid polymer electrolyte separator and that the electrolyte is a eutectic mixture of ionic liquids.

First of all, cathode stack 1' was formed. First, 0.76 g of an eutectic mixture of ionic liquids (1:1 mol ratio of EMITFSI and PYR14FSI, SOLVIONIC SA), and 0.025 g of binder (PTFE) were added to 0.25 g of an active material activated carbon (YP80) and mixed to form cathode paste 1B. Next, by similar steps to those of forming the cathode stack 1', the anode active material layer 2B was formed on one surface of the anode current collector 2A to form the anode stack 2' in disk shape.

Next, the electrolyte separator 3' was formed using the same ionic liquid as the cathode and anode. First, 6 g of 1:1 mol ratio of EMITFSI and PYR14FSI (eutectic mixture of ionic liquids) is added to 4 g of polyDDATFSI (SOLVIONIC SA) and 5 g of acetonitrile and mixed. The solution was casted using doctor-blade and dried for 120 minutes in open air. Next the membrane obtained is further dried in an oven under vacuum at 80° C. for overnight. Next, the dried electrolyte separator 3' with a thickness of 37 um is cut into a disk of 13 mm in diameter. Finally, the ionic liquid polymer electrolyte separator is laminated onto the cathode. After that, the cathode stack 1' with laminated separator 3' were laminated to anode stack 2' such that the cathode active material layer 1B with the electrolyte separator 3 and the anode active material layer 2B to face each other with the separator 3' in between. Thus, the electrochemical capacitor (a sealed CR2032 coin cell from MTI corporation) was completed.

Experimental Example 3

A similar electrochemical capacitor illustrated in FIG. 4 was formed by similar steps to those in Experimental Example 2, except that, the ionic liquid used is PIP13FSI (SOLVIONIC SA) in the cathode 1B, anode 2B and separator 3' and a different activated carbon (CNP00001) were used. In the case where the electrode layers 1 and 2 were formed, 0.70 g of ionic liquid PIP13FSI, and 0.025 g of binder (PTFE) were added to 0.25 g of an active material activated carbon (CNP00001, ACS material) and mixed and kneaded into a dough for 30 minutes in open air.

Experimental Example 4

A similar electrochemical capacitor illustrated in FIG. 4 was formed by similar steps to those in Experimental Example 2, except that, the ionic liquid used is N1113TFSI in the cathode 1', anode 2' and separator 3' and a different activated carbon were used. In the case where the electrode layers 1B and 2B were formed, first, 2.56 g of ionic liquid N1113TFSI, and 0.011 g of binder (PTFE) were added to 0.100 g of graphene (GN1P0005, ACS Material) and mixed and kneaded into a dough for 30 minutes in open air.

Of course, the present disclosure is not limited to the embodiments that have just been described and many other embodiments of the electrode processing apparatus can be proposed.

The invention claimed is:

1. A method for making an electrode for an ionic liquid-based supercapacitor comprising two electrodes separated by an electrolyte separator comprising an ionic polymer with an ionic liquid, comprising:
    a step for making a carbon paste resulting from mixing carbon materials, ionic liquids and a binder, so as to obtain an active material for the electrode at room temperature; and
    a step for forming the electrode from mechanically processing the active material;
    wherein the carbon paste comprises 10 to 40 weight percent carbon active material and 0 to 10 weight percent binder mixed in 60 to 90 weight percent electrolyte.

2. The method of claim 1, wherein the electrode forming step comprises a paste rolling technique.

3. The method of claim 2, wherein the paste rolling technique comprises use of a calendaring machine.

4. The method of claim 1, wherein the electrode forming step comprises a paste 3D printing technique.

5. The method of claim 1, wherein the electrode forming step comprises a paste stamping technique.

6. The method of claim 1, wherein the electrode forming step comprises an extrusion technique.

7. The method of claim 1, wherein the electrode forming step comprises a jet milling technique.

8. The method of claim 1, wherein ionic liquids are used to mix the carbon materials with the binder.

9. The method of claim 1, wherein the ionic liquids have a purity of at least 99.9%; $H_2O \leq 20$ ppm; halides$\leq 1$ ppm; lithium, sodium and potassium$\leq 10$ ppm; organic nitrogen compounds$\leq 10$ ppm; color test 20-10 Hazen; the ionic liquids comprising cations selected from among the group consisting of alkyl imidazolium, alkyl pyrrolidinium, morpholinium based cations, pyridinium based cations, phosphonium based cations, ammonium based cations; the ionic liquids further comprising anions selected from among the group consisting of bis(trifluoromethanesulfonyl)imide (TFSI), bis(fluorosulfonyl)imide (FSI), dicyanamide (DCA), 4,5-dicyano-2-(trifluoromethyl)imidazolide (TDI), and fluorosulfonyl-(trifluoromethanesulfonyl)imide (FTFSI).

10. An electrode-electrolyte combination comprising:
    an electrode; and
    an electrolyte for an ionic liquid-based supercapacitor;
    wherein the electrode-electrolyte combination is formed by a method comprising:
        a step for making a carbon paste resulting from mixing carbon materials, ionic liquids and a binder, so as to obtain an active material for the electrode at room temperature; and
        a step for forming the electrode from mechanically processing the active material;
        wherein the carbon paste comprises 10 to 40 weight percent carbon active material and 0 to 10 weight percent binder mixed in 60 to 90 weight percent electrolyte.

11. A supercapacitor, comprising:
    a cathode electrode;
    an electrolyte separator; and
    an anode electrode;

the cathode electrode, electrolyte separator, and anode electrode forming a stack, the cathode electrode and the anode electrode being electrically connected to current collectors,
  wherein the electrolyte separator comprises an ionic polymer with an ionic liquid, and the electrodes comprise a carbon paste including a carbon-based active material mixed with an ionic liquid electrolyte and a binder;
wherein the carbon paste comprises 10 to 40 weight percent carbon active material and 0 to 10 weight percent binder mixed in 60 to 90 weight percent electrolyte.

12. The supercapacitor of claim 11, wherein the ionic liquid of the electrolyte separator and the ionic liquid of the electrodes are distinct.

13. The supercapacitor of claim 11, wherein the ionic polymer electrolyte includes an ionic polymer and ionic liquid, wherein the electrolyte separator comprises a self-standing electrolyte separator.

14. The supercapacitor of claim 11, wherein the supercapacitor has a predefined shape matching a shape of a support.

15. The supercapacitor of claim 14, wherein the support is flexible.

16. The supercapacitor of claim 11, wherein the current collectors are printed or deposited collecting devices.

17. A method for making a supercapacitor, comprising:
mixing carbon materials, ionic liquids and a binder to form a carbon paste;
forming an active material for electrodes of the supercapacitor from the carbon paste at room temperature; and
forming an electrolyte separator of the supercapacitor comprising an ionic polymer with an ionic liquid;
wherein the carbon paste comprises 10 to 40 weight percent carbon active material and 0 to 10 weight percent binder mixed in 60 to 90 weight percent electrolyte.

18. The method of claim 17, further comprising:
providing a first current collector;
forming on the first current collector a first electrode from a first carbon paste resulting from mixing carbon material, ionic liquid and a binder, so as to obtain an active material for the first electrode at room temperature;
providing on the first electrode an electrolyte separator comprising an ionic polymer and an ionic liquid;
providing a second current collector;
forming on the second current collector a second electrode from a second carbon paste resulting from mixing carbon material, ionic liquid and a binder; and
assembling the second current collector, the second electrode, the electrolyte separator, the first current collector, and the first electrode.

* * * * *